(12) United States Patent
Rowland et al.

(10) Patent No.: US 6,668,874 B2
(45) Date of Patent: Dec. 30, 2003

(54) GAS ASSISTED FLOW TUBE AND FILLING DEVICE

(75) Inventors: Roderick Rowland, Fairfax, VA (US); Tony F. Zahrah, Fairfax, VA (US); Rajkumar Raman, Waldorf, MD (US); Phillip A. Parrish, Fairfax, VA (US)

(73) Assignee: Matsys, Springfield, VA (US)

( * ) Notice: Subject to any disclaimer, the term of this patent is extended or adjusted under 35 U.S.C. 154(b) by 0 days.

(21) Appl. No.: 10/263,755

(22) Filed: Oct. 4, 2002

(65) Prior Publication Data

US 2003/0031749 A1 Feb. 13, 2003

Related U.S. Application Data

(60) Division of application No. 09/688,168, filed on Oct. 16, 2000, now Pat. No. 6,485,284, which is a continuation-in-part of application No. 09/418,502, filed on Oct. 15, 1999, now Pat. No. 6,402,500, which is a continuation-in-part of application No. 08/964,128, filed on Nov. 6, 1997, now abandoned.

(51) Int. Cl.[7] ............................................. B65B 31/00
(52) U.S. Cl. ............................... 141/4; 141/44; 141/48; 141/12; 141/11; 141/67
(58) Field of Search ................................. 141/4, 44, 47, 141/48, 49, 12, 63, 11, 67; 406/50, 91, 127, 130, 131, 138

(56) References Cited

U.S. PATENT DOCUMENTS

| | | | | |
|---|---|---|---|---|
| 1,759,983 A | | 5/1930 | Houston | |
| 2,797,715 A | * | 7/1957 | Triteline | 141/67 |
| 2,981,298 A | * | 4/1961 | Vogt | 141/49 |
| 3,045,717 A | * | 7/1962 | Vogt | 141/12 |
| 3,176,369 A | | 4/1965 | Dennis et al. | |
| 3,322,219 A | * | 5/1967 | Van Pernis | 141/68 |
| 3,647,333 A | | 3/1972 | Smith | |
| 3,664,385 A | * | 5/1972 | Carter | 141/12 |
| 3,693,672 A | * | 9/1972 | Hiland | 141/46 |
| 3,788,787 A | | 1/1974 | Silbereisen et al. | |
| 3,832,107 A | | 8/1974 | Cox et al. | |
| 3,984,320 A | * | 10/1976 | Barefoot | 141/44 |
| 3,995,771 A | | 12/1976 | Olivier | |
| 4,591,324 A | | 5/1986 | Kubota | |
| 4,599,215 A | | 7/1986 | Smarsly et al. | |
| 4,841,884 A | | 6/1989 | Engstrom et al. | |
| 4,859,073 A | | 8/1989 | Howseman, Jr. et al. | |
| 4,928,739 A | * | 5/1990 | Teubert | 141/5 |
| 4,970,804 A | | 11/1990 | Hüttlin | |
| 4,974,646 A | * | 12/1990 | Martin et al. | 141/67 |
| 5,000,624 A | | 3/1991 | Steiger | |
| 5,017,754 A | | 5/1991 | Drouet et al. | |
| 5,096,096 A | | 3/1992 | Calaunan | |
| 5,143,486 A | | 9/1992 | Geoffroy | |
| 5,188,296 A | * | 2/1993 | Duez et al. | 406/92 |

(List continued on next page.)

OTHER PUBLICATIONS

Mikio Kondoh et al., "Development of Uniform Powder Filling Method—Aeration Powder Filling", 6 pages.

Primary Examiner—Gregory Huson
Assistant Examiner—Khoa Huynh
(74) Attorney, Agent, or Firm—Millen, White, Zelano & Branigan, P.C.

(57) ABSTRACT

A gas-assisted flow and filling device for transporting particulate material and filling die cavities includes a source of low-pressure gas for delivering gas to a chamber that is separated from a fluidizing chamber by a porous distributor plate which permits the gas to flow through the particulate material and out a vent screen so that the particulate material is permitted to flow out of the fluidizing chamber essentially free of gas and wherein the pressure of the gas delivered to the fluidizing chamber is sufficient to provide a gas bearing to said particulate material adjacent the distributor plate, but not high enough to cause turbulence in said fluidizing chamber.

8 Claims, 6 Drawing Sheets

U.S. PATENT DOCUMENTS

| | | | |
|---|---|---|---|
| 5,213,816 A | | 5/1993 | Smyth, Jr. et al. |
| 5,316,056 A | * | 5/1994 | Stott .......................... 141/68 |
| 5,400,921 A | | 3/1995 | Smith, Jr. et al. |
| 5,469,994 A | | 11/1995 | Reh et al. |
| 5,598,876 A | * | 2/1997 | Zanini et al. .................. 141/59 |
| 5,615,830 A | | 4/1997 | Matsunaga et al. |
| 6,402,500 B1 | | 6/2002 | Zahrah et al. |
| 6,485,284 B1 | | 11/2002 | Rowland et al. |

* cited by examiner

GAS ASSISTED FLOW TUBE AND FILLING DEVICE

This application is a divisional application of U.S. patent application Ser. No. 09/688,168, filed Oct. 16, 2000 now U.S. Pat. No. 6,485,284, which is a continuation-in-part of application Ser. No. 09/418,502, filed on Oct. 15, 1999 now U.S. Pat. No. 6,402,500; which is a continuation-in-part application of U.S. patent application Ser. No. 08/964,128, filed Nov. 6, 1997, now abandoned. Applicants claim priority pursuant to 35 U.S.C. §120; and, the subject matter of those applications is incorporated herein in its entirety.

BACKGROUND

The invention relates in general to techniques and apparatus for consistently and uniformly transporting and delivering particulate material such as powder. Such transport and delivery systems are used for filling cavities such as in die-casting machines prior to powder compaction in processes for fabricating consolidated parts for automotive, aerospace, micro-electronics, vitamins, pharmaceuticals, and the like.

Particulates such as powder are typically fed from a main hopper and transferred through a tube to a feed or fill shoe which deposits the particulates into the die cavity by gravity or pressure. There are several problems, however, associated with prior art processes for powder delivery and filling of die cavities especially die cavities for high precision, small parts. One such problem is a variation or inconsistency in powder flow in the flexible tube connecting a main hopper or powder supply to a feed shoe on a die surface of a die casting machine. Clumping and surge of the particulates within the flexible tubing and/or the feed shoe also contribute to the non-uniform filling of die cavities. Mechanical shaking of the feed structure above the die cavity can reduce clumping in the powder and improve fill uniformity, but such shaking is not necessarily consistent during successive filling operations. Moreover, such shaking causes segregation of fine materials from coarse materials which results in a loss of uniformity in particle-size distribution and chemical composition.

SUMMARY

Preferred embodiments of the invention provide improved particulate flow and transport during delivery of the particulate materials to structures such as the die cavities of die-casting machines. In one embodiment, the invention includes an improved transport and filling system which employs a gas-control unit.

DESCRIPTION OF THE PREFERRED EMBODIMENTS

Figure 1:
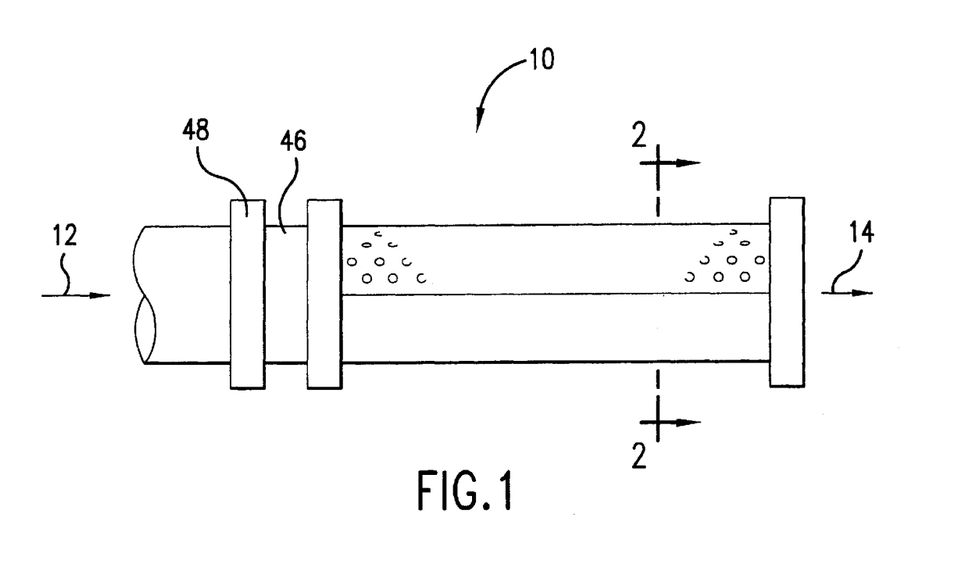
FIG. 1 is a schematic side view of a fluidizing portion of a delivery tube.
Figure 2:
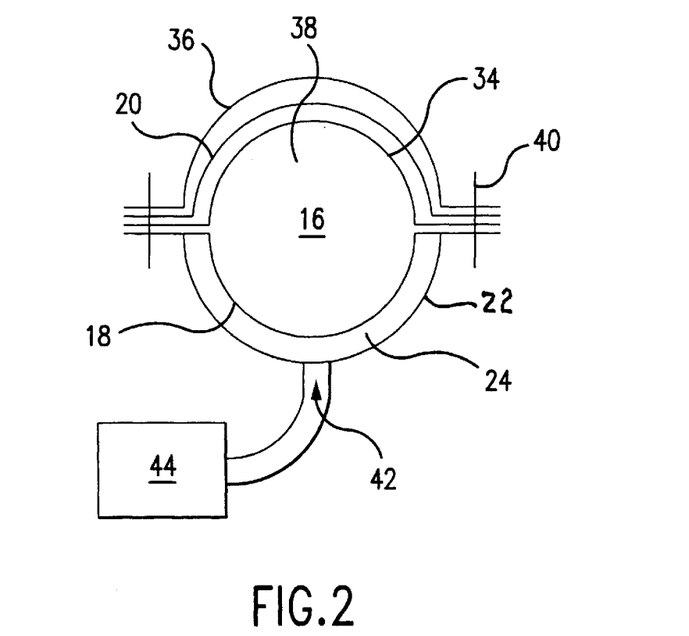
FIG. 2 is a sectional view of FIG. 1 taken along the lines 2—2 and includes additional detail.
Figure 3:
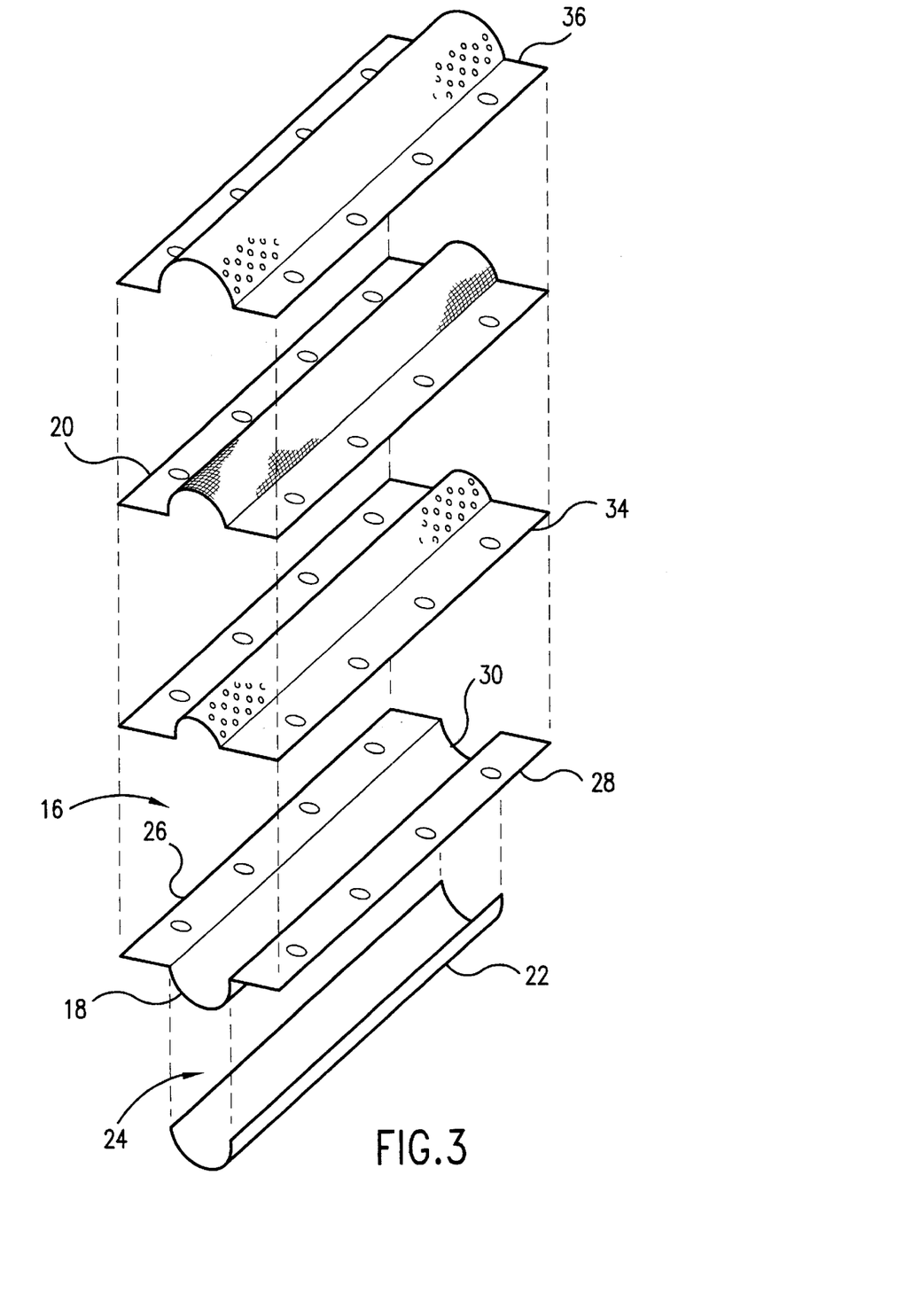
FIG. 3 is an exploded view of portions of the FIG. 1 and FIG. 2 structure.

Generally speaking, a typical die-cavity is fed by a system comprising a main hopper which is connected to a fill shoe by a flexible or semi-flexible delivery tube or the like. It is then the fill shoe itself which interfaces with the die cavity as the fill shoe is moved back and forth above the cavity to deposit the particulate material into the cavity. In this respect, FIG. 1 illustrates a fluidizing portion 10 of a delivery tube. The fluidizing portion 10 may be inserted, for example, between two portions of the feed tube or between the feed tube and the fill shoe as the case may be. The fluidizing portion 10 has an inlet port 12 which receives the particulates such as powder into a first chamber 16 located between a porous distributor plate 18 and a vent screen 20 (FIGS. 2 and 3.)

A solid semi-cylindrical gas-chamber plate 22 is located adjacent, but spaced from the porous distributor plate 18 to form a second chamber 24 between the porous distributor plate 18 and the plate 22. In this respect, the porous plate 18 has pores that are between about 0.1 micron and about 50 microns (or even 100 microns depending upon the powder or other particulate-material size that is being fluidized)—the particle sizes being larger than the pores of the porous plate 18—the pores preferably being on the order of about ½ micron. In any event, the pore size of the porous distributor plate 18 depends on the particle-size distribution of the particulate material and is suitably chosen to prevent clogging by entrapment of small particles within the pores.

The porous distributor plate 18 can have flanges 26 and 28 and can be conveniently semi-cylindrical as at 30, and shaped to form one side of each of the first and second chambers 16 and 24 respectively. The porous material is preferably sintered stainless steel to provide high strength, good wear properties, good weldability, and, corrosion resistance, but other similarly suitable materials may be used as well.

The vent screen 20 may also be flanged, and semi-cylindrical. The vent screen 20 is supported by a similarly shaped vent screen support 34; and, the vent screen 20 is covered by a vent screen protective cover 36. The vent screen 20, the vent screen support 34, and a protective cover 36 are inverted over the porous plate 18 to form an overall tubular shape as shown to form a particulate flow channel 38 (FIG. 2)—the parts being affixed by suitable fasteners such as 40.

A gas-inlet port 42 is affixed, such as by welding, to the solid plate 22. The port 42, in turn, is connected to a pressure regulator 44. In this respect, the gas pressure is carefully regulated only to loosen and fluidize the particulate material in contact with the porous distributor plate 18. The gas pressure and gas flow should be kept sufficiently low that the powder does not bubble. In this regard, it is the particulate material that is to be transported—not the gas. That is, the particulate material on the porous plate 18 is simply loosened by migration of the low-pressure gas through the porous distributor plate 18. The bottom surface of the particulate that is in contact with the porous distributor plate 18 is loosened first and as the gas flow is increased, the particulates are fluidized—the amount of fluidization being controlled by regulating the gas flow to the inlet gas port 42.

Proper regulation of the gas flow is important to the proper performance of the system. In the most preferred embodiment of the invention, the powder layer in contact with the porous distributor plate is merely loosened to provide a "gas bearing" which reduces friction and increases the powder flow rate so that, as will be discussed in more detail shortly, the gas flows through the vent screen and out of the top of the transport tube 36 and essentially it is only a solid stream of powder that is transported through the flow channel rather than the gas.

Metal powders typically used in the powder metallurgy industry often include lubricants and have relatively good flow characteristics. For these powders, the gas pressure applied to the second chamber 24 is typically between about 1 to 2 psi and rarely greater than about 5 psi. The pressure that is employed in any given instance depends upon not only the nature of the particulate material, but the diameter of the flow tube, the mesh size of the porous distributor plate and its thickness. In any event, the pressure is adjusted so that the gas leaves through the vent screen 20 rather than flowing with the particulate material.

Ceramic powders typically used in the ceramics industry are spray-dried and can also be characterized as having good flow characteristics. For these powders, the applied gas pressure used in the chamber 24 is usually less than 3 psi and typically closer to 1 psi.

For finer powders with poor flow characteristics, the magnitude of the applied gas pressure may be increased depending upon the powder characteristics, but again, care should be exercised to keep the applied gas pressure to the minimum that is necessary to accomplish the functions of loosening the lowermost layer of powder; permitting the gas to escape through the vent screen; and, limiting the amount of gas that is permitted to flow through the transport tube with the loosened particulate material.

The above-discussed pressures are those applied to the upstream side of the porous distributor plate 18. Because of the pressure drop across the porous distributor plate, the pressure applied to the powder itself is proportionately less. Additionally, the semi-cylindrical shape of the porous plate has no corners and reduces dead space so that essentially all of the particulates in contact with the porous distributor plate 18 are fluidized at very low gas flow rates. In this manner, the powder in contact with the porous distributor plate 18 is fluidized while the remaining powder is merely loosened. The use of such low gas pressure also prevents powder segregation in the transport tube when using a powder mixture or alloy with a wide powder-size distribution; prevents the dusting of fine particles; and, discharges the particulates in a solid stream. The use of too high a gas pressure, on the other hand, results in turbulence in the entire powder mass which causes powder segregation, dusting of fine particles, and a resulting low discharge volume of powder which can cause a malfunctioning of the delivery system.

As noted above, the fluidizing portion 10 is covered with vent screen 20 which allows the fluidizing gas to escape from the transport to prevent the build-up of pressure within the transport while entraining particles. The mesh size of the venting screen 20 depends, again, on the particle-size distribution of the particulate material that is being used, but a preferred embodiment of the vent screen 20 can be made out of woven stainless steel screen having fine mesh openings of about 25–100 microns with about 40 microns being preferred. The woven stainless steel mesh is flexible but supported by the vent screen support 34 on the underside and protected by the vent-screen protective cover 36 on its upper side. The vent screen support 34 is made out of a perforated material and controls the shape of the top half of the fluidizing portion 10 of the transport tube. While many shapes can be used, the preferred embodiment is a semi-circular shape, but the woven stainless steel vent screen 20 takes its shape from the vent screen support 34. The vent-screen protective cover 36 is made out of a perforated material that is preferably about the same perforation pattern and size as the vent screen support 34; and, care is taken during assembly to align the holes in the vent screen support 34 with the vent screen protective cover 36 to maximize the venting area and insure that the fluidizing gas escapes through the top of the fluidizing portion 10 rather than being permitted to cause mischief in the flow channel 38. Depending upon the application, a structure such as the porous distributor plate 18 having a coarse mesh size such as about 100 microns can be used as a substitute for the vent screen support 34, the vent screen 20, and the vent screen protective cover 36.

The Fasteners 40 permit the vent screen protective cover 36 to be easily removed for cleaning or replacement of the vent screen 20 without disassembling the transport device in its entirety.

In a preferred embodiment an insert tube 46 (FIG. 1) connects the fluidizing portion 10 to the remainder of the feed tube. The insert tube 46 can have a uniform inside diameter and a variable outside diameter so that the end of the insert tube 46 which connects to the fluidizing portion 10 is essentially equal to the inside diameter of the fluidizing portion 10; and, the other end of the insert tube has at least a portion of its outside diameter that is essentially equal to the inside diameter of the overall transport tube. A suitable collar such as 48 can be used to surround the insert tube 46 and suitably affix it to the overall transport tube.

Figure 4:
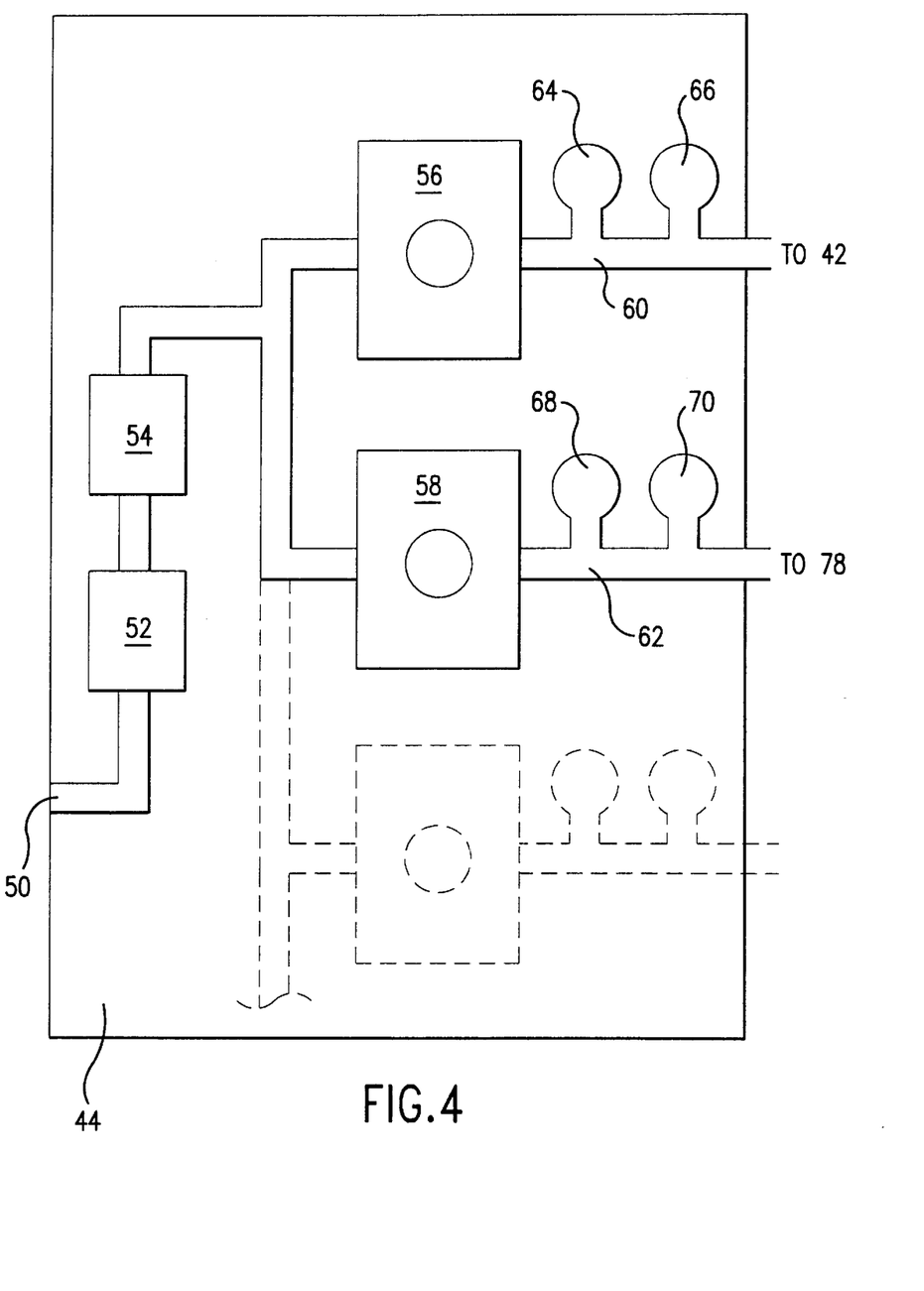
FIG. 4 is a schematic view of a gas-control unit that is useful in the practice of the invention.

A typical embodiment of the gas control unit 44 is illustrated in FIG. 4 and can be located in a separate housing. It is used to control the moisture content of the gas and to regulate the gas pressure and gas flow rate to both the gas-inlet port 42 and a corresponding port in a fill-shoe portion to be discussed shortly. A gas supply 50 to the regulator 44 passes it through an in-line dryer 52 which removes moisture from the supply gas and an in-line Filter 54 which removes solid impurities from the supply gas. The dried, filtered gas is delivered to one or more pressure regulators such as 56 and 58 from which lines 60 and 62, respectively, deliver gas to inlet ports 42 and 78. The line 60 is equipped with a pressure gauge 64 and a flow meter 66; and, the line 62 is equipped with a pressure gauge 68 and a flow meter 70. Similar regulators and associated equipment can be added for additional gas inlet ports corresponding to 42 and 78. Such additions, however, will be apparent to those skilled in the art and will not be further discussed.

Figure 5:
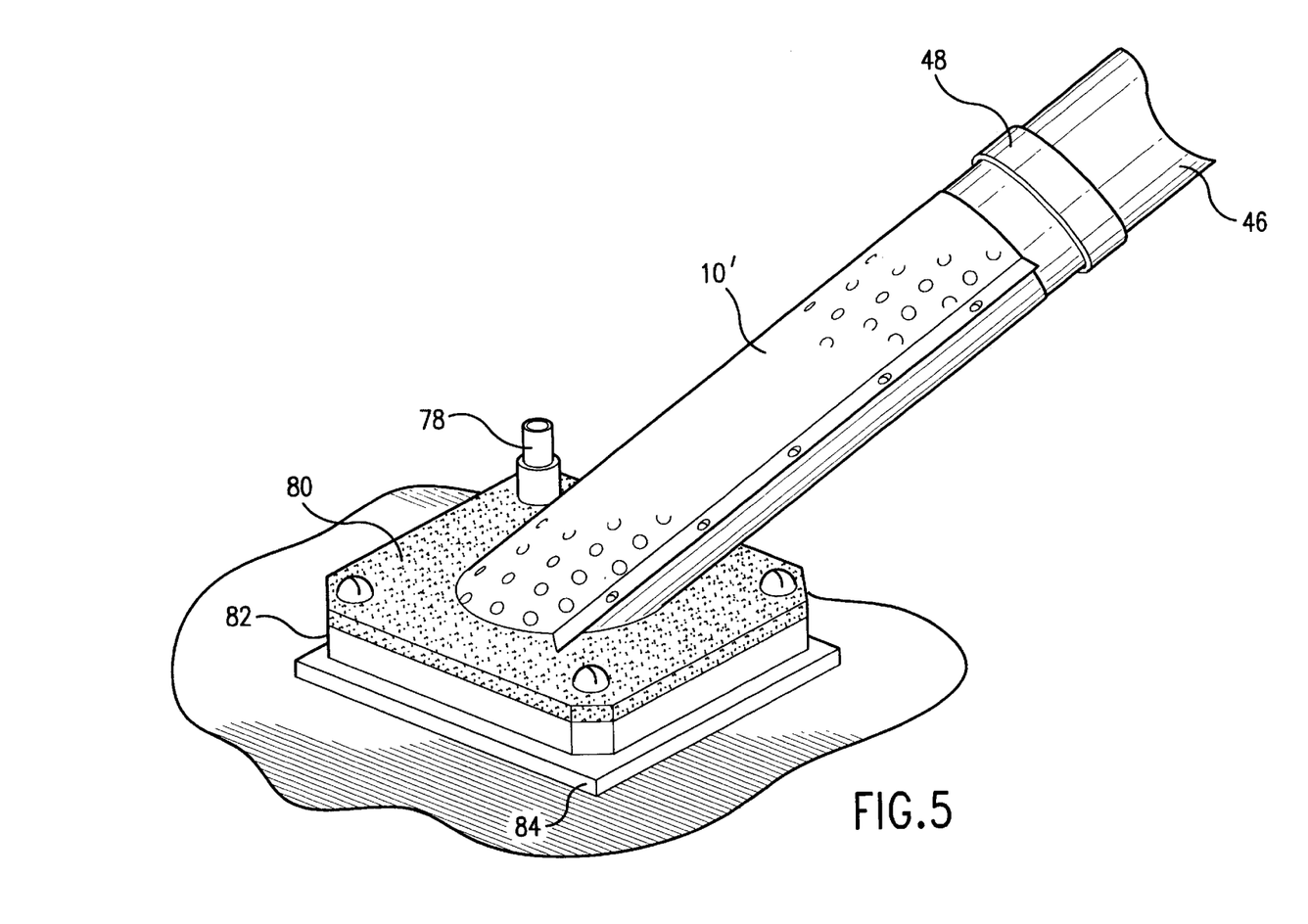
FIG. 5 is a pictorial view of an alternative embodiment of the invention.
Figure 6:
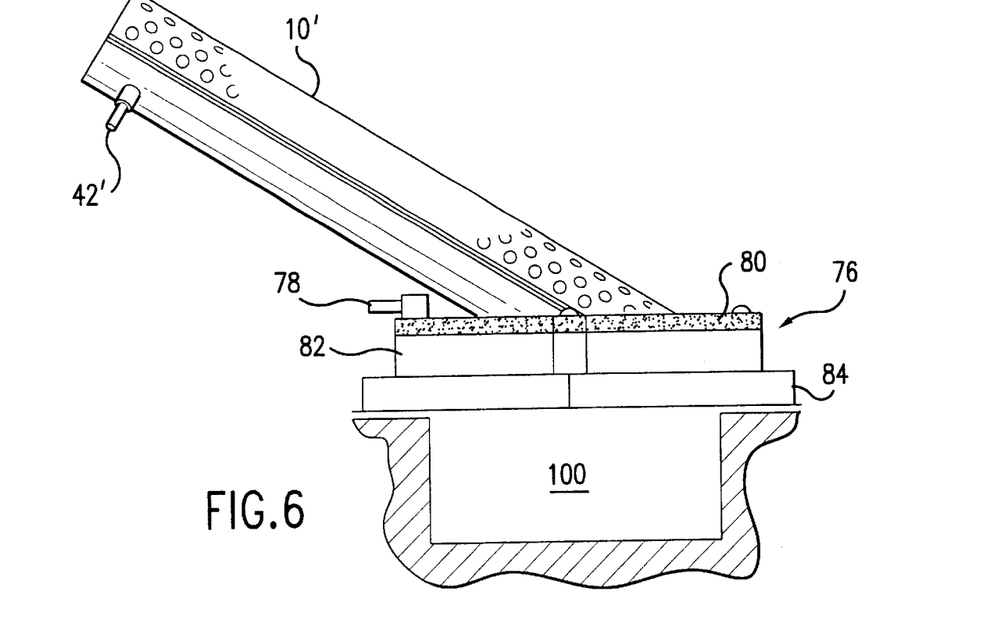
FIG. 6 is a schematic side view of the embodiment of FIG. 5.
Figure 7:
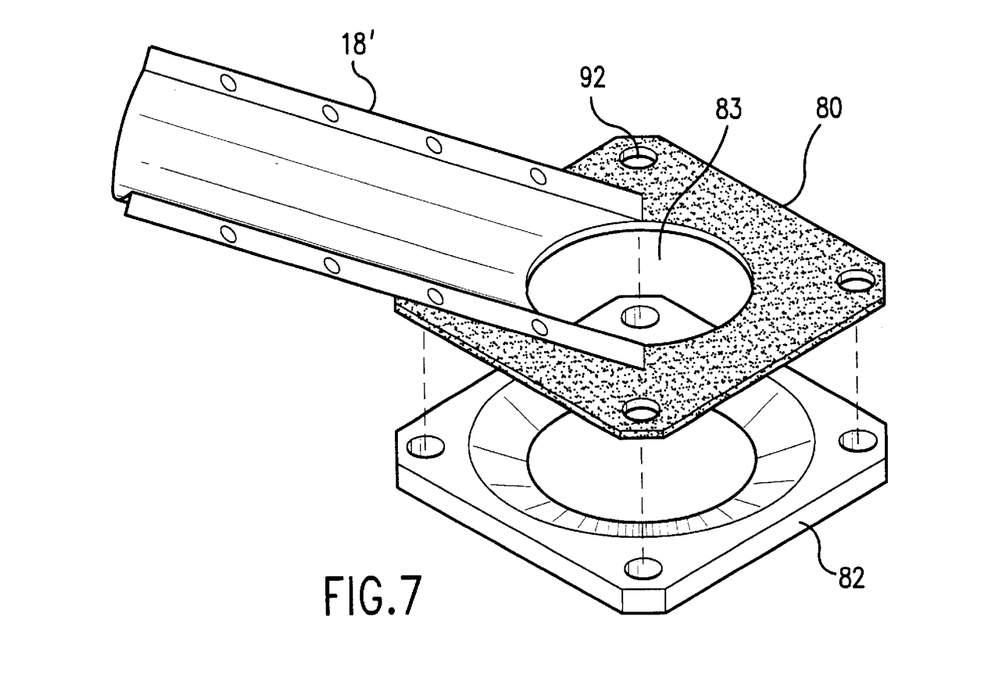
FIG. 7 is a pictorial view illustrating a pre-assembly relationship between selected elements of the FIG. 6 structure.
Figure 8:
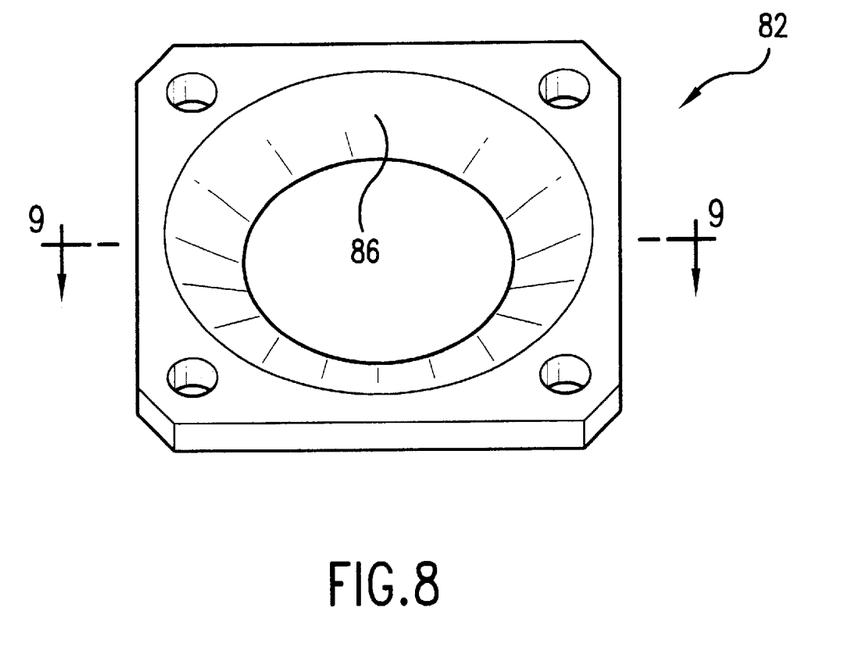
FIG. 8 is a pictorial view, a portion of the FIG. 7 structure.

In the FIGS. 5 and 6 embodiment, a fluidizing portion 10' corresponds to fluidizing portion 10 in the earlier embodiment, but is at a downstream location and connected directly to a fill-shoe 76 which has a gas inlet port 78. A sintered metal vent screen 80 is attached, such as by welding, to a porous fluidizer plate 18' (FIG. 7)—the remainder of the fluidizing portion 10' corresponds to that of the FIGS. 1–3 embodiment and will not be further discussed.

The fluidizing aspects of the fill-shoe 76 correspond functionally to the fluidizing portion 10, but are structured differently as will now be described.

The fill-shoe structure 76 is comprised of the fluidizing portion 10' which acts, in this instance, as a particulate transport mechanism to a delivery chute 82 of the fill-shoe 76 (FIG. 6). The fluidizer 10' receives gas from the regulator 44 at gas inlet port 42' and passes the particulates through an aperture 83 in the vent screen 80. The screen 80 is, in turn, attached to the delivery chute 82 which, if desired, is attached to a bottom plate 84 fabricated from a slidable material such as Delrin, polycarbonate, Teflon, or the like.

Figure 9:
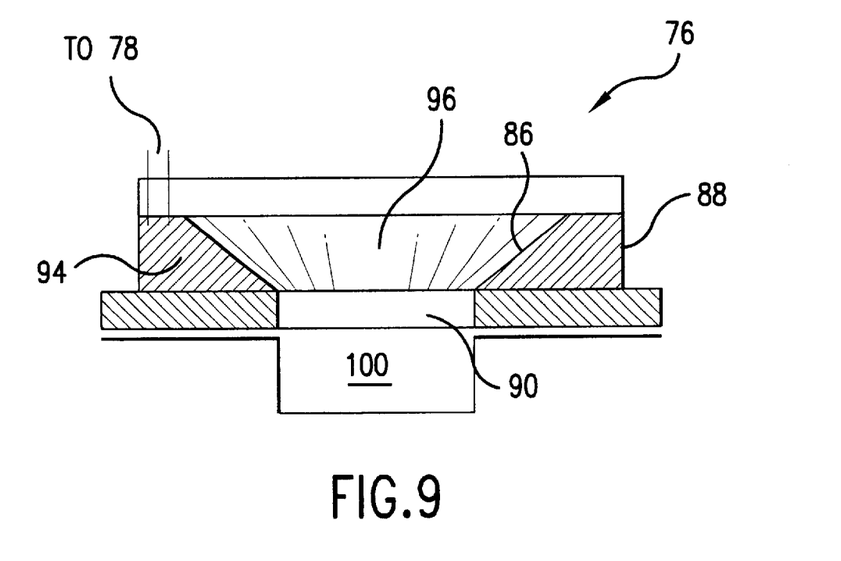
FIG. 9 is a schematic, cross-sectional view taken along the lines 9—9 of FIG. 8.

The delivery chute 82 includes a conically shaped segment 86 (FIGS. 7 and 9) which functions as a porous distributor plate corresponding to porous plate 18 in the earlier embodiment. That is, except for the shape, it is structured and pore-sized in the same manner as the porous distributor plate 18. A delivery chute housing 88 (FIG. 9) includes an aperture 90 which communicates to a conventional die cavity such as 100 in FIG. 6.

Gas from the inlet port 78 is delivered to a chamber 94 formed between the ring-shaped porous distributor plate 86 and the housing 88 of the fill-shoe 76 to provide fluidizing gas at roughly the same low pressures as in the first embodiment to loosen and fluidize the particulate layer that is in contact with the segment 86. The low-pressure gas is then vented through the sintered vent screen 80 which is affixed to the delivery chute 82 by suitable fasteners (not shown) in apertures 92 of the vent screen 80. The inlet-gas port 78, however, functions as one of the fasteners and delivers the low pressure gas from the regulator 44 to the chamber 94 located between the porous distributor ring 86 and the housing 88 and corresponding to the second chamber 24 in the first embodiment. The inlet gas port 78 is located so that it is directly aligned with the weld seam that joins the two ends of the porous distributor ring 86. In this manner, the weld seam serves as a baffle to distribute the gas around the ring 86. The space between the porous distributor ring 86 and the vent screen 80 forms a first chamber 96 corresponding to the first chamber 16 and the first embodiment.

In a preferred embodiment, the fluidizing portion 10' intersects the vent screen 80 at an angle of about 45 degrees to the horizontal. This angle can be adjusted, however, to meet the clearance and space requirements of a given die-casting machine; and, the length of the fluidizing portion 10' can also be adjusted to meet the space requirements of the die-casting machine. In the illustrated embodiments, the length of the fluidizing portion 10' is about 5 inches, but it can be made shorter or longer as necessary; and, can be separated from the vent screen 80 by a length of conventional transport material if desired—its location depending upon where it is that fluidization is required.

In the illustrated embodiment, the fluidizing portion 10' serves an additional function of isolating the delivery chute 82 from the affects of variable head pressures. It also conditions the particulate material before it is transferred to the delivery chute 82 to ensure uniform and consistent flow of particulate material into the delivery chute 82.

The inclination of the porous distributor ring or plate 86 to the horizontal is preferably about 45 degrees, but can be adjusted depending upon the powder-flow characteristics, the cavity size, and the available space. If desired, the slope of the porous distributor ring 86 can be as steep as vertical to maximize the opening size on the bottom of the delivery chute 82.

Fluidization within the delivery chute 82 is controlled by regulating the gas pressure to inlet port 78 depending on the characteristics of the particulate material that is being delivered, but again, the gas pressure should be kept to a minimum. The use of low gas pressure ensures that essentially only the layer of particulate material near the porous distributor ring 86 is fluidized while the rest of the powder within the delivery chute 82 is merely loosened, uniform, and consistent. The use of low pressure gas and low gas-flow rates prevent turbulence in the particulate material within the delivery chute 82 and prevents powder segregation when using a powder mixture with a wide particle-size distribution. It also prevents the dusting of fine particles. The vent screen 80 allows the gas to escape and prevents gas-pressure build up within the delivery chute 82 so that the particulate material is delivered to the die cavity by gravity rather than pressure. The venting screen 80 is preferably made of sintered stainless steel, but so long as it is porous, other materials can be used. Advantages of the sintered stainless steel screen are that it provides structural strength; permits the porous fluidizer 18' to be welded to it; and, provides structural integrity to the apparatus.

The mesh size of the vent Screen 80, as in the first embodiment, depends on the particle size distribution of the particulate material that is being employed, but it should be proximate the die-cavity 100 to ensure that gas escapes from the area of the delivery chute and avoids variations in filling, and partial filling, especially for particulates with poor flow characteristics. In this regard, the size of the pores in the vent screen should be maximized to insure that fluidizing gas escapes without interfering with the gravity flow of the particulate material into the die cavity. For metal powders with admixed lubricants typically used in powder metallurgy, the applied gas to the second chamber 94 should at least be less than about 5 psi so that, after the pressure drop across the porous distribution ring 86, there is no turbulence in the particulate material; the fluidizing gas easily escapes through the vent screen 80; and, the particulate material is permitted to drop into the die cavity by gravity. For ceramic powders typically used in the ceramic industry, the gas pressure applied at the inlet port 78 should be less than about 3 psi, but for fine powders with poor flow characteristics, the magnitude of the applied gas might be increased slightly with care being taken to keep the applied gas pressure at the minimum necessary to merely loosen the lower-most layer of particulate material.

In some embodiments, the gas pressure may be selectively turned on and off, but in the preferred embodiments the gas pressure is turned on and left on continuously. It is monitored, however, and adjusted to provide the various advantages of the invention. In this respect, low-tonnage die-casting machines are operated at speeds of up to about 120 strokes per minutes and more. Given the very low gas-flow rates and the high press feeds, therefore, leaving the gas on at all times helps to stabilize the gravity-filling operation.

The fill shoe of a typical die-casting machine is customarily oscillated back and forth by a slide finger (not shown) which is part of the press mechanism. The slide fingers holds the bottom plate to the die surface so that excess powder is swept away from the die cavity. In this regard, the quantity measurement of the invention is volumetric in that the die cavity is filled only by gravity and not pressurized. That is, the system of the invention completely fills the die cavity to obtain an exact volume rather than attempting to force a measured weight of material into the die cavity by means of pressure.

The foregoing and other advantages and features of the invention will be apparent to those skilled in the art; and, certain modifications and departures can be made without departing from the spirit and scope of the invention which is defined by the following claims.

What is claimed is:

1. A method of transporting particulate material comprising the steps of:
   - delivering said particulate material to a fluidizing chamber;
   - delivering low-pressure gas to a gas chamber;
   - permitting said low-pressure gas to pass through a porous plate from said gas chamber into said fluidizing chamber, the pressure of said gas in said fluidizing chamber being sufficient to provide a gas-bearing for said particulate material adjacent said porous plate, but not high enough to cause turbulence in said fluidizing chamber; and,
   - venting said gas from said fluidizing chamber so that said fluidized particulate material is permitted to flow out of said fluidizing chamber essentially free of said gas.

2. The method of claim 1 including the step of selecting the pore size of said porous plate to prevent clogging by entrapment of particles of said particulate materials within said pores.

3. The method of claim 1 including the step of selecting the material for said porous plate to provide strength, wear-resistance, weldability and corrosion resistance.

4. The method of claim 1 including the step of regulating the pressure of said low pressure gas so as to loosen the particulate material adjacent said porous plate and then increasing said gas pressure only enough to fluidize said particulate material without causing said particulate material to turbulate.

5. The method of claim 1 wherein said low-pressure gas is continuously supplied to said gas chamber.

6. The method of claim 1 including the step of selectively turning said low-pressure gas on and off.

7. The method of claim 1 for use in a fill shoe for filling a die cavity, said fluidizing chamber being located in said fill shoe and wherein said method includes the step of sliding said fill shoe back and forth above said die cavity; and,
   wherein said particulate material is delivered to said die cavity by gravity.

8. The method of claim 7 wherein said particulate material is distributed into said die cavity by volume and not by weight.

* * * * *